(12) United States Patent
Sawyer et al.

(10) Patent No.: US 10,174,931 B2
(45) Date of Patent: Jan. 8, 2019

(54) INTEGRATED OPTICAL MODULES WITH ENHANCED RELIABILITY AND INTEGRITY

(71) Applicant: APPLE INC., Cupertino, CA (US)

(72) Inventors: Kevin A. Sawyer, Cupertino, CA (US); Yazan Z. Alnahhas, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 512 days.

(21) Appl. No.: 14/941,689

(22) Filed: Nov. 16, 2015

(65) Prior Publication Data

US 2016/0356484 A1 Dec. 8, 2016

Related U.S. Application Data

(60) Provisional application No. 62/170,189, filed on Jun. 3, 2015.

(51) Int. Cl.

| *F21V 29/90* | (2015.01) |
|---|---|
| *G02B 13/00* | (2006.01) |
| *F21V 25/04* | (2006.01) |
| *G02B 27/42* | (2006.01) |
| *H04N 5/225* | (2006.01) |
| *H04N 9/31* | (2006.01) |
| *G03B 3/10* | (2006.01) |
| *G03B 21/14* | (2006.01) |

(52) U.S. Cl.
CPC .............. *F21V 29/90* (2015.01); *F21V 25/04* (2013.01); *G02B 13/0065* (2013.01); *G02B 13/0085* (2013.01); *G02B 27/425* (2013.01); *G03B 3/10* (2013.01); *G03B 21/142* (2013.01); *H04N 5/2254* (2013.01); *H04N 9/3144* (2013.01); *H04N 9/3161* (2013.01); *H04N 9/3173* (2013.01); *G03B 2205/0084* (2013.01)

(58) Field of Classification Search
CPC ...... H04N 5/04; H04N 9/3135; H04N 9/3161; H04N 9/3164; H04N 9/3173; G03B 2205/0084; G02B 27/425; G02B 13/0085
USPC .............................. 372/34, 36, 78; 356/239.2
See application file for complete search history.

(56) References Cited

U.S. PATENT DOCUMENTS

| 4,951,150 A * | 8/1990 | Browning | ............ H04N 5/7408 348/753 |
|---|---|---|---|
| 5,389,911 A * | 2/1995 | Madau | ................ B60R 25/1004 180/287 |

(Continued)

FOREIGN PATENT DOCUMENTS

JP     H03237303 A     10/1991

OTHER PUBLICATIONS

International Application # PCT/US2016/24885 Search Report dated May 31, 2016.

*Primary Examiner* — Tuan Nguyen
(74) *Attorney, Agent, or Firm* — D. Kligler Services LTD.

(57) ABSTRACT

An optical module includes a transparent substrate and a refractive optical element mounted on the substrate. A conductive heating trace is deposited on the substrate around the refractive optical element. A temperature sensor senses a temperature of the substrate. Control circuitry is coupled to the temperature sensor so as to measure a difference between the temperature of the substrate and a target operating temperature of the module, and to drive a current through the conductive heating trace, responsively to the difference, so as to heat the substrate to the target operating temperature.

12 Claims, 3 Drawing Sheets

(56) References Cited

U.S. PATENT DOCUMENTS

| | | | |
|---|---|---|---|
| 7,986,473 B2 * | 7/2011 | Bloch | H04N 5/2256 |
| | | | 355/30 |
| 8,872,668 B2 | 10/2014 | Schhare | |
| 8,958,011 B2 | 2/2015 | Park et al. | |
| 9,091,413 B2 | 7/2015 | Petronius et al. | |
| 2005/0135743 A1 | 6/2005 | Ascanio et al. | |
| 2007/0177363 A1 * | 8/2007 | Jayanetti | G06F 21/86 |
| | | | 361/760 |
| 2008/0240502 A1 | 10/2008 | Freedman et al. | |
| 2009/0059979 A1 | 3/2009 | Tanaka | |
| 2009/0185274 A1 | 7/2009 | Shpunt | |
| 2010/0053604 A1 * | 3/2010 | Rice | H04N 9/3161 |
| | | | 356/239.2 |
| 2012/0206046 A1 | 8/2012 | Huang et al. | |
| 2014/0230553 A1 | 8/2014 | Vokey et al. | |
| 2015/0276547 A1 * | 10/2015 | Shpunt | B81C 99/003 |
| | | | 356/124 |

* cited by examiner

INTEGRATED OPTICAL MODULES WITH ENHANCED RELIABILITY AND INTEGRITY

CROSS-REFERENCE TO RELATED APPLICATION

This application claims the benefit of U.S. Provisional Patent Application 62/170,189, filed Jun. 3, 2015, which is incorporated herein by reference.

FIELD OF THE INVENTION

The present invention relates generally to optical devices, and particularly to miniaturized integrated optical devices and methods for their manufacture.

BACKGROUND

Optical modules are very commonly used in consumer electronic devices. For example, almost all current portable telephones and computers include a miniature camera module. Miniature optical projection modules are also expected to come into increasing use in portable consumer devices for a variety of purposes.

Such projection modules may be used, for example, to cast a pattern of structured light onto an object for purposes of 3D mapping (also known as depth mapping). In this regard, U.S. Patent Application Publication 2008/0240502 describes an illumination assembly in which a light source, such as a laser diode or LED, transilluminates a transparency with optical radiation so as to project a pattern onto the object. (The terms "optical" and "light" as used in the present description and in the claims refer generally to any and all of visible, infrared, and ultraviolet radiation.) An image capture assembly captures an image of the pattern that is projected onto the object, and a processor processes the image so as to reconstruct a three-dimensional (3D) map of the object.

Optical projectors may, in some applications, project light through one or more diffractive optical elements (DOEs). For example, U.S. Patent Application Publication 2009/0185274 describes apparatus for projecting a pattern that includes two DOEs, which are together configured to diffract an input beam so as to at least partially cover a surface. The combination of DOEs reduces the energy in the zero-order (undiffracted) beam. In one embodiment, the first DOE generates a pattern of multiple beams, and the second DOE serves as a pattern generator to form a diffraction pattern on each of the beams.

As another example, U.S. Pat. No. 9,091,413 describes photonics modules that include optoelectronic components and optical elements (refractive and/or patterned) in a single integrated package. According to the inventors, these modules can be produced in large quantities at low cost, while offering good optical quality and high reliability. They are useful as projectors of patterned light, for example in 3D mapping applications as described above, but they may also be used in various other applications that use optical projection and sensing, including free-space optical communications.

SUMMARY

Embodiments of the present invention that are described hereinbelow provide integrated optical devices with enhanced reliability and integrity.

There is therefore provided, in accordance with an embodiment of the invention, an optical module, including a transparent substrate and a refractive optical element mounted on the substrate. A conductive heating trace is deposited on the substrate around the refractive optical element, and a temperature sensor is configured to sense a temperature of the substrate. Control circuitry is coupled to the temperature sensor so as to measure a difference between the temperature of the substrate and a target operating temperature of the module, and to drive a current through the conductive heating trace, responsively to the difference, so as to heat the substrate to the target operating temperature.

In some embodiments, the temperature sensor includes a resistive trace deposited on the substrate in a vicinity of the refractive optical element, and the control circuitry is configured to measure a resistance of the resistive trace in order to find the difference between the temperature of the substrate and the target operating temperature. In a disclosed embodiment, the module includes an optical output element, which is connected to the substrate by a mechanical seal. The resistive trace is deposited on the substrate beneath the mechanical seal so that the resistive trace break upon disruption of the mechanical seal, and wherein the control circuitry is configured to inhibit operation of the optical module upon detecting, based on the resistance, that the resistive trace has broken.

In an alternative embodiment, the module includes an optical output element, which is connected to the substrate by a mechanical seal, wherein the conductive heating trace is deposited on the substrate beneath the mechanical seal so that the conductive heating trace will break upon disruption of the mechanical seal. The control circuitry is configured to measure a resistance of the conductive heating trace and to inhibit operation of the optical module upon detecting, based on the resistance, that the conductive heating trace has broken.

In a disclosed embodiment, the substrate includes a plate having opposing first and second sides, wherein the conductive heating trace is formed on the first side and the temperature sensor is located on the second side.

Typically, the module includes a plurality of refractive optical elements having respective optical powers, and the conductive heating trace is deposited on the substrate around the refractive optical element having the greatest optical power within the plurality.

In some embodiments, the module includes an optical patterning element and an emitter, which is configured to direct light through the module. The refractive optical element focuses the light from the emitter through the optical patterning element so as to produce a pattern of structured light.

There is also provided, in accordance with an embodiment of the invention, an optical module, including a transparent substrate and an optical output element, which is connected to the substrate by a mechanical seal. A conductive trace is deposited on the substrate beneath the mechanical seal so that the conductive trace will break upon disruption of the mechanical seal. Control circuitry is coupled to measure a resistance of the conductive trace and to inhibit operation of the optical module upon detecting, based on the resistance, that the conductive trace has broken.

In some embodiments, the optical output element includes an optical patterning element, and the module includes an emitter, which is configured to direct light through the module, which focuses the light from the emitter through the optical patterning element so as to produce a pattern of structured light. Typically, the control circuitry is configured to shut off the emitter upon detecting that the conductive trace has been broken.

There is additionally provided, in accordance with an embodiment of the invention, a method for producing an optical module. The method includes mounting a refractive optical element in a location on a transparent substrate. A conductive heating trace is deposited on the substrate around the location of the refractive optical element. A temperature sensor is coupled to sense a temperature of the substrate. Control circuitry is coupled to the conductive heating trace and to the temperature sensor so as to measure a difference between the temperature of the substrate and a target operating temperature of the module and to drive a current through the conductive heating trace, responsively to the difference, so as to heat the substrate to the target operating temperature.

The present invention will be more fully understood from the following detailed description of the embodiments thereof, taken together with the drawings in which:

DETAILED DESCRIPTION OF EMBODIMENTS

Figure 1:
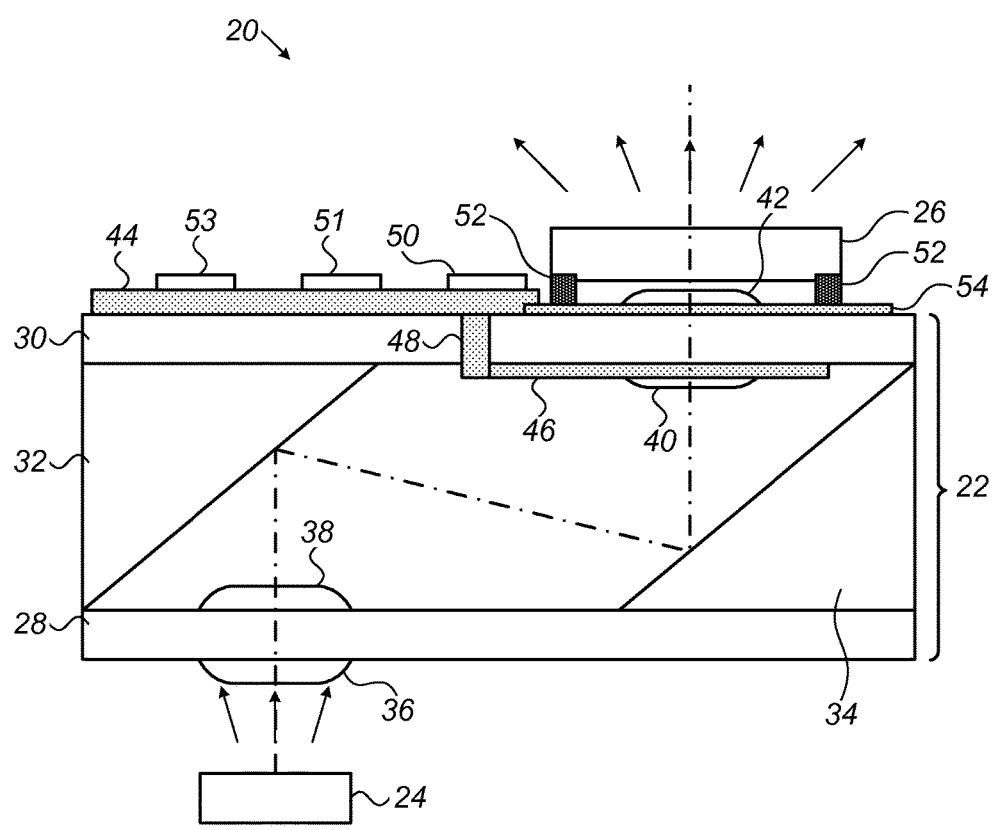
FIG. 1 is a schematic side view of an optical module with temperature and integrity control circuits, in accordance with an embodiment of the invention.

Mass production of miniaturized optical devices calls for product designs that meet the often-conflicting objectives of high precision and reliability and low manufacturing cost. For example, a miniature projection module may be configured to project a structured light pattern, and images of the pattern captured by a camera module may then be processed for purposes of depth mapping. For accurate depth mapping, it is important that the contrast and geometry of the pattern be consistent and well controlled.

At the same time, consumer devices are expected to function in a wide range of different temperatures and environmental conditions. Temperature variations cause components of the optical modules to expand and contract, leading to changes in focal properties. Thermal swings can particularly degrade the performance of projection optics in structured light projection modules, leading to reduced resolution, range and accuracy of systems that are built on such modules. This problem is particularly acute when the optical components of the module include refractive elements made from molded plastic (dictated by the need for mass production at low cost), because such elements are particularly prone to thermal expansion and contraction.

Another issue that can affect the performance of projection modules in consumer electronic devices is loss of mechanical integrity. For example, if a mechanical or thermal shock causes the patterning element in a projection module, such as a diffractive optical element or other patterned transparency, to break, become detached, or shift out of place, the module may emit an intense, highly directional beam, rather than a structured pattern as intended.

Embodiments of the present invention that are described herein address these problems by incorporating electrical traces and control circuitry into integrated optical modules, in order to detect and handle faults and deviations that can occur due to thermal and mechanical perturbations. In some embodiments, the same traces and control circuits may be used both to detect and compensate for temperature variations and to detect and protect against injury that may result from loss of mechanical integrity. Alternative embodiments address these problems individually.

Some embodiments of the present invention that are described in this patent application provide techniques and components that can be used to mitigate the effect of thermal swings. These embodiments use closed-loop temperature control, which is typically applied to the lens or lenses in the module that have the greatest optical power, and thus are most prone to changes in focal length due to thermal expansion and contraction. Although the disclosed embodiments relate specifically to projection modules, the principles of the present invention may similarly be applied, mutatis mutandis, in enhancing the performance of other sorts of miniaturized and integrated optical modules.

Other embodiments of the present invention provide means for detecting loss of mechanical integrity in a projection module, so that inhibitory action can be taken (such as shutting off the light emitter in the projection module). The circuit traces that are used in such embodiments to detect loss of mechanical integrity can readily be integrated with the traces that are used for temperature control, as described hereinbelow. The disclosed techniques and components for detecting loss of mechanical integrity can similarly be used in other sorts of optical modules, as well.

FIG. 1 is a schematic side view of an optical module with temperature and integrity control circuits, in accordance with an embodiment of the invention. In this embodiment, an emitter 24, such as a chip containing a laser diode or laser diode array, emits light (which may be visible, infrared and/or ultraviolet) into an optical core 22 of module 20. Lenses in optical core 22 collimate and direct the light through an optical output element, for example a patterning element 26, such as a diffractive optical element (DOE) or microlens array, so as to produce a pattern of structured light that can be projected onto a scene.

Core 22 comprises lower and upper transparent covers 28 and 30, which are enclosed at the sides by beam-folding reflectors 32 and 34, having the form of prisms in the pictured example. Refractive lenses 36, 38, 40 and 42, which are typically made from molded plastic, are mounted on covers 28 and 30, which thus serve as substrates for the lenses. In the pictured embodiment, the lenses are aligned with reflectors 32 and 34 in order to define a folded optical path and thus reduce the dimensions of module 20. Lens 42 is assumed in this example to have the greatest optical power of the four lenses, while the other lenses serve as field correctors. Covers 28 and 30 typically comprise glass plates, although any other suitable transparent dielectric substrate may be used for this purpose.

In the present example, lenses 36, 38, 40 and 42 together serve to expand and collimate the beam from emitter 24 and direct the beam through patterning element 26 in order to project the pattern of structured light onto an object or scene of interest. An imaging module (not shown), such as an image sensor with suitable optics, captures an image of the pattern, which is then processed in order to provide depth data regarding the object or scene. As explained above, thermal expansion and contraction of the elements of optical core 22, and particularly of lens 42, can strongly affect the quality of collimation of the beam that is directed by the module through the patterning element, and thus degrade the projected pattern.

In order to minimize this sort of degradation, one or more of the lenses in module 20 are heated to a constant target temperature, regardless of the ambient temperature in which the module is located. For this purpose, temperature control traces 46 are deposited on a surface of the structure holding the lens with the most optical power, i.e., on a surface of cover 30 surrounding the location of lens 42 in the present example. Traces 46 may be formed from any suitable conductive material, such as platinum, indium tin oxide (ITO), aluminum, gold, or gold alloys, for example CrAu. In the pictured example, temperature control traces 46 are formed on the inner surface of cover 30 and connected by through-hole vias 48, passing through the cover, to a flexible printed circuit board 44 outside core 22. Alternatively, the temperature control traces may be formed on the outer surface of the cover, in which case vias are not needed. Temperature control components, such as a sensing circuit 50 and a current driver 51, which provides the heating current, are mounted on or connected to board 44.

Figure 2:
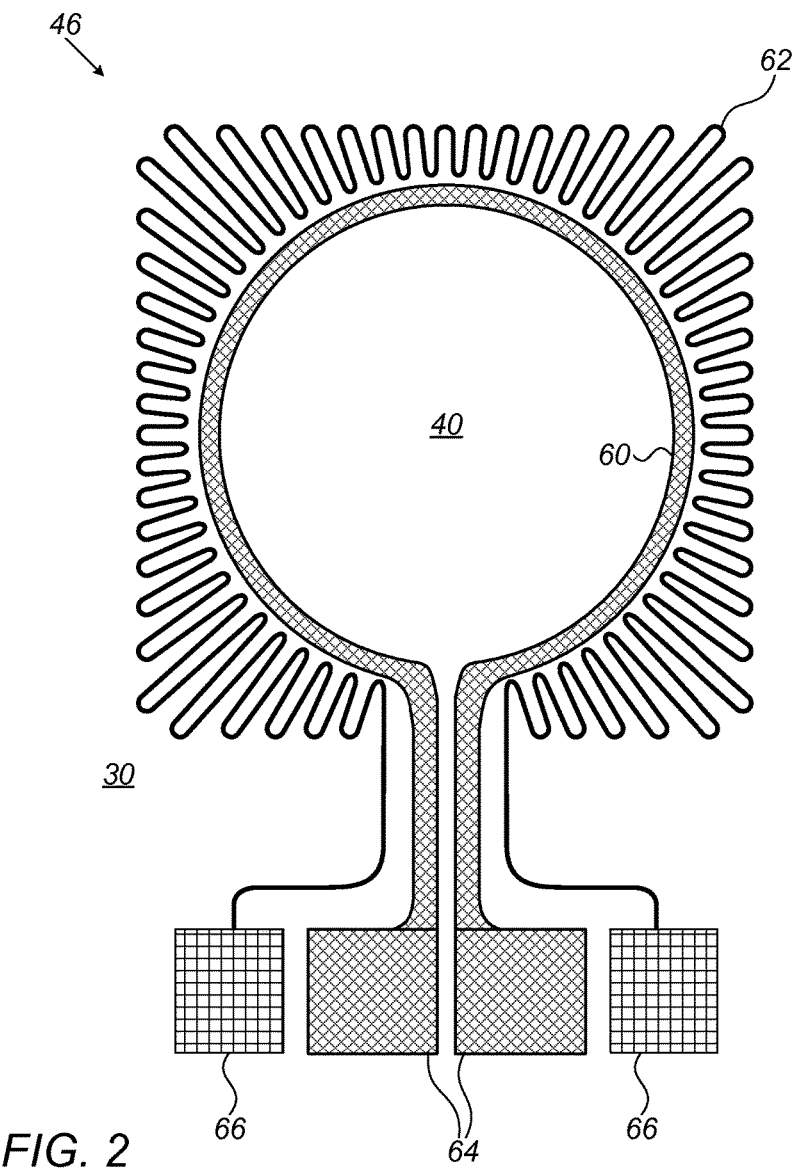
FIG. 2 is a schematic frontal view of circuit traces formed on a transparent substrate, in accordance with an embodiment of the invention.

Temperature sensing circuit 50 monitors the temperature of the heated portion of cover 30 in order to provide feedback to current driver 51. For this purpose, circuit 50 receives an input signal from a temperature sensor, such as a thermistor (typically NTC type) or a resistance temperature detector (RTD), as shown in FIG. 2. In some embodiments, the temperature sensing and heating elements are located on opposing surfaces of cover 30 for purposes of the temperature control loop, for example with the temperature sensor on the top surface of cover 30, thus providing a gap between the sensor and temperature control traces 46 on the bottom surface. The current injected by current driver 51 will vary depending on the size of the temperature difference from the ideal calibration temperature at which optical module 20 is designed to operate.

Patterning element 26 is attached to the upper side of cover 30 by a mechanical seal 52. Before sealing patterning element 26 to optical core 22, circuit traces 54 are deposited on the outer surface of cover 30 underneath the location of seal 52. These circuit traces are connected via flexible printed circuit 44 to an integrity controller 53. The integrity controller typically comprises a simple logic circuit, which checks the continuity of the circuit traces, typically by measuring their resistance.

Although integrity controller 53 is shown in FIG. 1 as a separate functional component, it may conveniently be integrated in a single physical component with temperature sensing circuit 50 (particularly when the temperature sensing is resistance-based). Temperature sensing circuit 50, driver 51, and integrity controller 53 are collectively and individually referred to herein "control circuitry," and may be implemented together as a single physical component or as two or more separate physical components.

Under normal conditions, the resistance of circuit traces 54 will be low, indicating that the mechanical integrity of seal 52 between patterning element 26 and cover 30 is intact. If the seal breaks due to removal of the patterning element or mechanical damage, however, the resistance value of circuit traces 54 will be much higher (typically indicating an open circuit). In this case, integrity controller 53 will sense the increase in resistance and will inhibit operation of module 20, typically by shutting down the current provided to emitter 24. Thus, the potential of unwanted emission from optical module 20 without patterning element 26 in place will be avoided.

FIG. 2 is a schematic frontal view of a part of cover used in optical module 20, in accordance with an embodiment of the invention. Circuit traces 46 are deposited on the surface of cover 30, surrounding the area where lens 42 is to be mounted. As noted earlier, although traces 46 are shown in FIG. 1 on the inner surface of cover 30, these traces may, alternatively or additionally, be formed on the outer surface of the cover and may be integrated functionally with traces 54 for purposes of integrity monitoring.

In the example shown in FIG. 2, traces 46 comprise a circular heating loop 60 with low resistance. Alternatively, the heating loop may comprise multiple turns (with a suitable via or insulating layer at crossings between turns) or, for low-current operation, the heating loop may be serpentine, with higher resistance. The temperature sensor in the pictured example is a resistance temperature detector (RTD), which measure changes in resistance over a serpentine loop 62 with high resistance, and thus high sensitivity. Both heating loop 60 and thermal sensing loop 62 are connected through respective pads 64, 66 to flexible printed circuit 44. When either or both of loops 60 and 62 are formed on the inner surface of cover 30, vias 48 connect the loops to printed circuit 44.

Loop 60 or 62 can also fulfill the function of traces (assuming the trace is formed on the outer surface of cover 30 below seal 52). Alternatively, traces 54 may be separate and independent from loops 60 and 62, having the form, for example, of a circular loop (like loop 60) below seal 52. In either case, the width and length of traces are chosen to give a desired working resistance, typically in the range of 1-10 kΩ. Integrity controller injects a small current through the trace either continuously or intermittently, and measures the resistance of the loop. If seal 52 is broken or disconnected, the circuit trace below the seal will be broken at the same time. The integrity controller will sense the resulting sharp increase in resistance and will shut down emitter 24 accordingly. The same resistance measurement can be used concurrently to monitor the temperature of lens 42, wherein changes in temperature will be indicated by much smaller changes in resistance.

Figure 3:
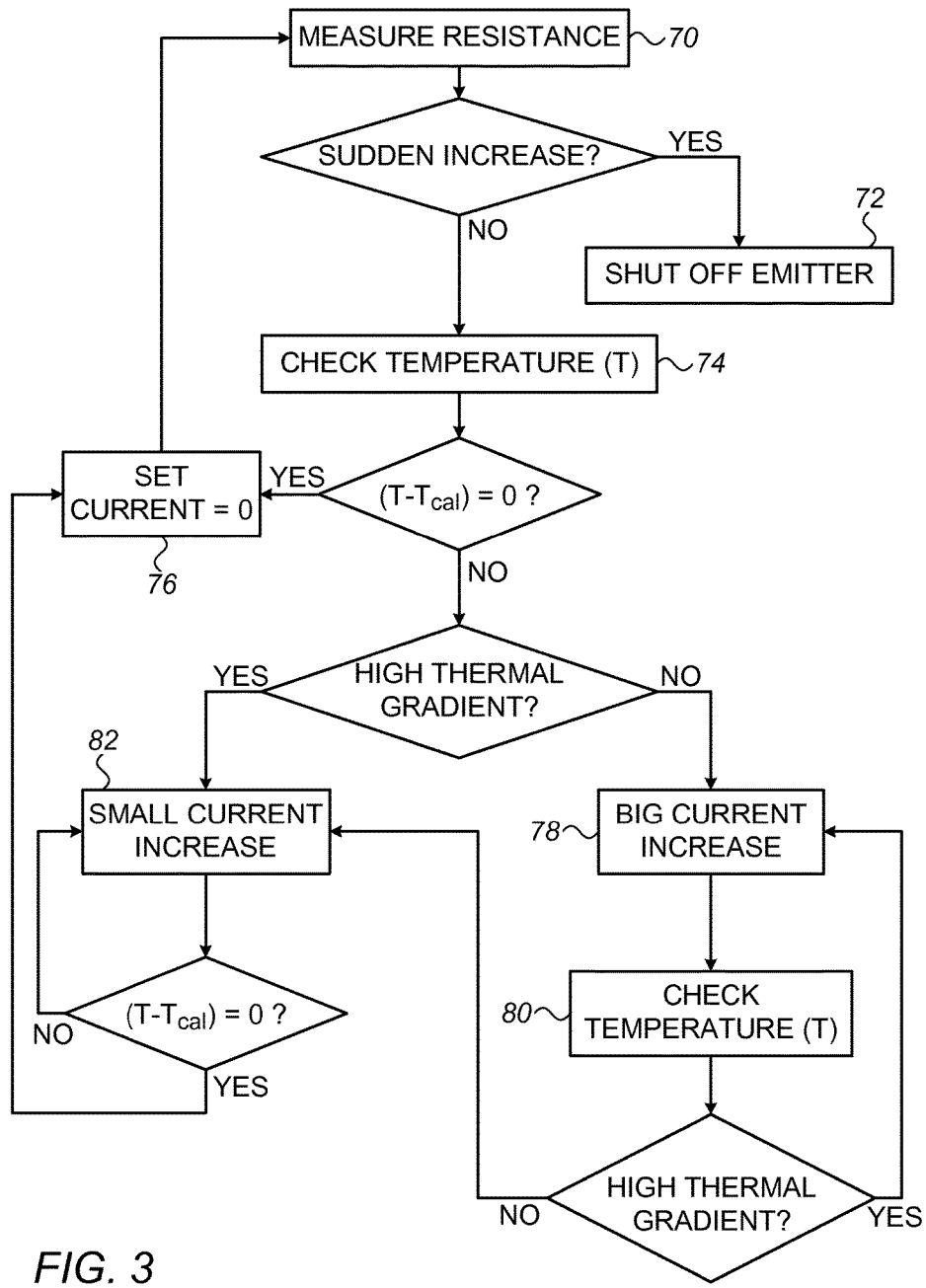
FIG. 3 is a flow chart that schematically illustrates a method for monitoring and controlling an integrated optical module, in accordance with an embodiment of the invention.

FIG. 3 is a flow chart that schematically illustrates the operation of the temperature and integrity control circuits in optical module 20, in accordance with an embodiment of the invention. The control procedure shown in FIG. 3 is performed intermittently by temperature sensing circuit 50, integrity controller 53 and driver 51. Although the integrity checking and temperature control functions are shown serially in FIG. 3 for the sake of simplicity, in practice these functions are typically performed in parallel.

Module 20 is designed to operate at a calibrated target temperature ($T_{cal}$), and the current driven through heating loop 60 depends on the thermal gradient between the measured temperature (T) and the calibrated target temperature. The gradient ($T-T_{cal}$) dictates how much current will be driven through the resistive load at any given time to ensure that the lens temperature stays at or close to the target temperature. The current is adjusted dynamically in order to optimize settling time of the heating system in response to changes in ambient temperature and to minimize performance deviation from the optical perspective.

Temperature sensing circuit 50 and integrity controller 53 periodically measure the resistance through the sensing loop, at a resistance measurement step 70. Upon detecting a sudden increase in resistance, above a predefined limit, integrity controller 53 inhibits operation of module 20, for example by shutting off the power to emitter 24, at a shutoff step 72.

Assuming the resistance to be within acceptable bounds, however, temperature sensing circuit 50 checks the latest temperature reading (or equivalently, the latest resistance measurement) against the target temperature $T_{cal}$, at a temperature checking step 74. If the temperature is equal to the target temperature (to within a predefined tolerance), circuit 50 directs driver 51 to shut off the heating current, at a current zeroing step 76.

On the other hand, if the temperature measured at step is considerably lower than the target temperature, meaning that a high thermal gradient exists between the present temperature and the target temperature, temperature sensing circuit 50 directs driver 51 to increase the current to heating loop 60 by a large increment, at a big increase step 78. Sensing circuit 50 rechecks the temperature, at a temperature verification step 80, and continues to direct driver 51 to increase the current by large increments at step 78 until the difference between the measured temperature and the target temperature is less than a predefined threshold, for example, no more than a few degrees.

When the difference between the temperature measured at step 74 or 80 and the target temperature is less than the predefined threshold, sensing circuit 50 directs driver to increase the current through loop 60 by a small increment, at a small increase step 82. Circuit 50 then rechecks the temperature and continues to direct driver 51 to apply small current increments at step 82 until the measured temperature is equal to the target temperature to within the desired tolerance.

The preceding figures illustrate a typical implementation of temperature and integrity control circuits and techniques, in accordance with an example embodiment of the invention. The principles of these circuits and techniques, however, may similarly be implemented in other sorts of optical modules, with different sorts of trace configurations and control circuits, as will be apparent to those skilled in the art after reading the present disclosure. Although the embodiments described above related specifically to certain types of optical projection modules with patterning elements for projection of structured light, and with particular module geometries, the principles of the present invention may similarly be applied to optical modules of other sorts, with different types of optical output elements and other geometries. All such alternative implementations of these principles are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical module, comprising:
   a transparent substrate;
   a refractive optical element mounted on the substrate;
   a conductive heating trace deposited on the substrate around the refractive optical element;
   a temperature sensor, comprising a resistive trace, which is deposited on the substrate in a vicinity of the refractive optical element and is configured to sense a temperature of the substrate;
   an optical output element, which is connected to the substrate by a mechanical seal, wherein the resistive trace is deposited on the substrate beneath the mechanical seal so that the resistive trace will break upon disruption of the mechanical seal; and
   control circuitry, which is coupled to the temperature sensor configured to measure a resistance of the resistive trace so as to measure a difference between the temperature of the substrate and a target operating temperature of the module, and to drive a current through the conductive heating trace, responsively to the difference, so as to heat the substrate to the target operating temperature, and to inhibit operation of the optical module upon detecting, based on the resistance, that the resistive trace has broken.

2. The module according to claim 1, wherein the substrate comprises a plate having opposing first and second sides, wherein the conductive heating trace is formed on the first side and the temperature sensor is located on the second side.

3. The module according to claim 1, wherein the module comprises a plurality of refractive optical elements having respective optical powers, and wherein the conductive heating trace is deposited on the substrate around the refractive optical element having the greatest optical power within the plurality.

4. The module according to claim 1,
   wherein the optical output element comprises an optical patterning element; and
   wherein the module comprises an emitter, which is configured to direct light through the module,
   wherein the refractive optical element focuses the light from the emitter through the optical patterning element so as to produce a pattern of structured light.

5. An optical module, comprising:
   a transparent substrate;
   an optical output element, which is connected to the substrate by a mechanical seal;
   a conductive trace deposited on the substrate beneath the mechanical seal so that the conductive trace will break upon disruption of the mechanical seal; and
   control circuitry, which is coupled to measure a resistance of the conductive trace and to inhibit operation of the optical module upon detecting, based on the resistance, that the conductive trace has broken;
   wherein the control circuitry comprises a printed circuit, and wherein the conductive trace comprises a loop surrounding an area of the substrate where the optical output element is to be mounted and connected to the printed circuit.

6. The module according to claim 5, wherein the optical output element comprises an optical patterning element, and wherein the module comprises an emitter, which is configured to direct light through the module, which focuses the light from the emitter through the optical patterning element so as to produce a pattern of structured light.

7. The module according to claim 6, wherein the control circuitry is configured to shut off the emitter upon detecting that the conductive trace has been broken.

8. A method for producing an optical module, the method comprising:
   mounting a refractive optical element in a location on a transparent substrate;
   depositing a conductive heating trace on the substrate around the location of the refractive optical element;
   depositing a resistive trace on the substrate in a vicinity of the refractive optical element to serve as a temperature sensor to sense a temperature of the substrate;

connecting an optical output element to the substrate by a mechanical seal, wherein the resistive trace is deposited on the substrate beneath the mechanical seal so that the resistive trace will break upon disruption of the mechanical seal;

coupling control circuitry to the conductive heating trace and to the temperature sensor so as to measure a difference between the temperature of the substrate and a target operating temperature of the module by measuring a resistance of the resistive trace and to drive a current through the conductive heating trace, responsively to the difference, so as to heat the substrate to the target operating temperature; and inhibiting operation of the optical module upon detecting, based on the resistance, that the resistive trace has broken.

9. The method according to claim 8, wherein the substrate comprises a plate having opposing first and second sides, wherein the conductive heating trace is formed on the first side and the temperature sensor is located on the second side.

10. The method according to claim 8, wherein the module comprises a plurality of refractive optical elements having respective optical powers, and wherein the conductive heating trace is deposited on the substrate around the refractive optical element having the greatest optical power within the plurality.

11. The method according to claim 8, and comprising directing light from an emitter via the optical module to the optical output element, which comprises an optical patterning element, wherein the refractive optical element focuses the light from the emitter through the optical patterning element so as to produce a pattern of structured light.

12. The method according to claim 11, wherein the control circuitry is configured to shut off the emitter upon detecting that the conductive circuit trace has been broken.

\* \* \* \* \*